Sept. 10, 1963  S. H. FLOYD ETAL  3,103,319
MACHINE FOR SLITTING A FABRIC INTO NARROW WIDTHS
Filed April 7, 1961  2 Sheets-Sheet 1
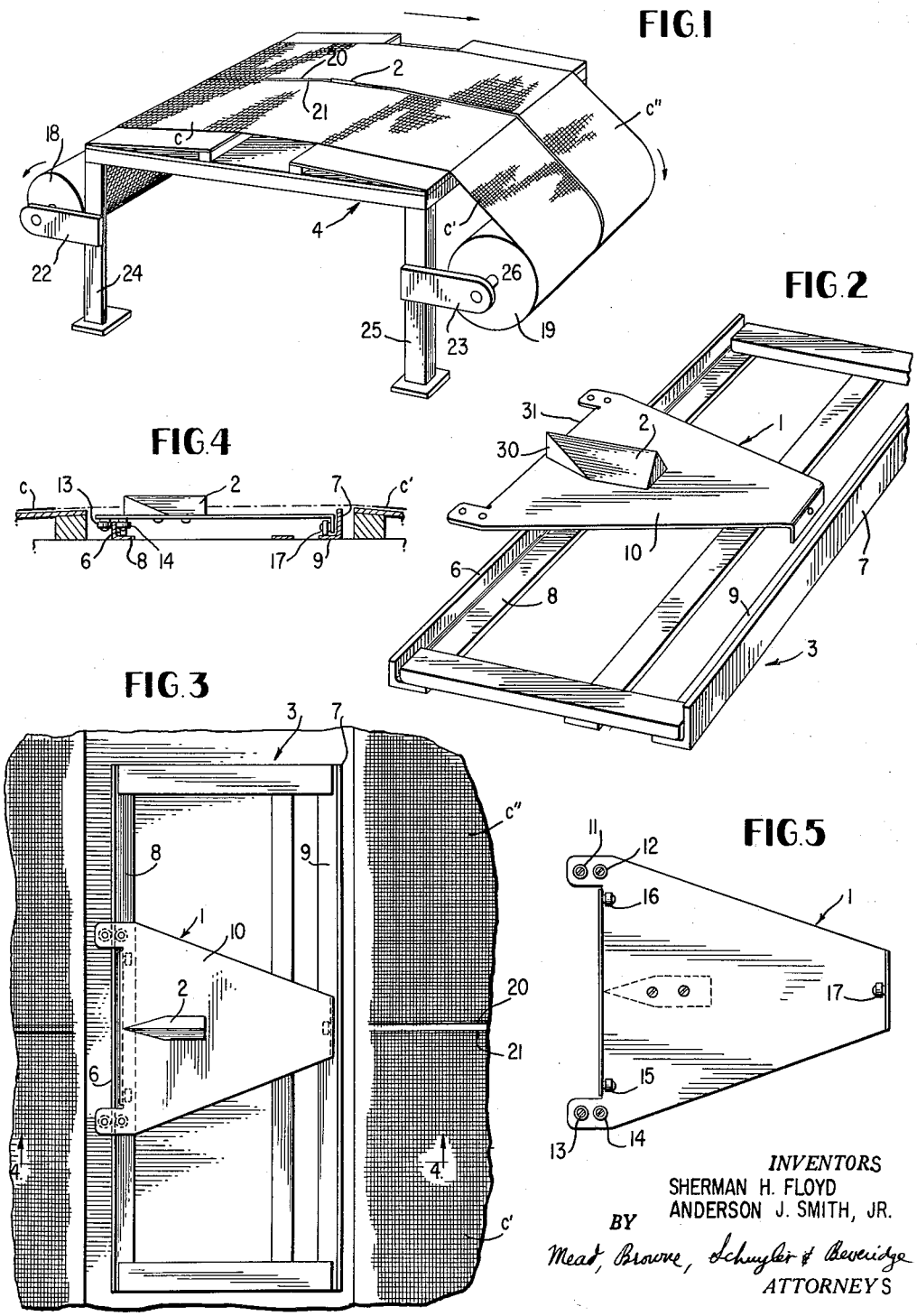
INVENTORS
SHERMAN H. FLOYD
ANDERSON J. SMITH, JR.
BY
Mead, Browne, Schuyler & Beveridge
ATTORNEYS Sept. 10, 1963  S. H. FLOYD ETAL  3,103,319
MACHINE FOR SLITTING A FABRIC INTO NARROW WIDTHS
Filed April 7, 1961  2 Sheets-Sheet 2
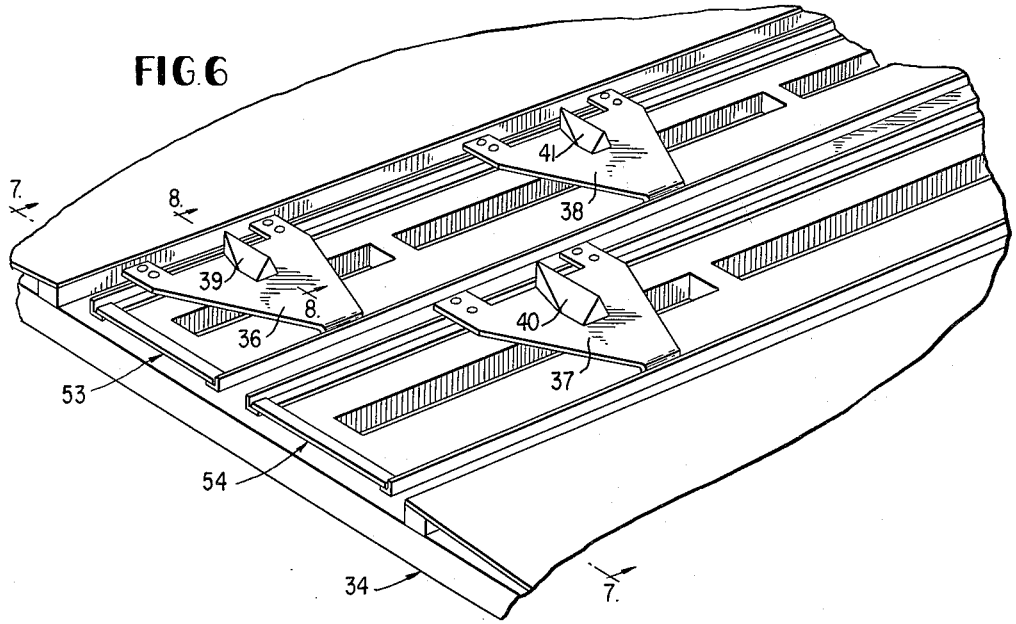
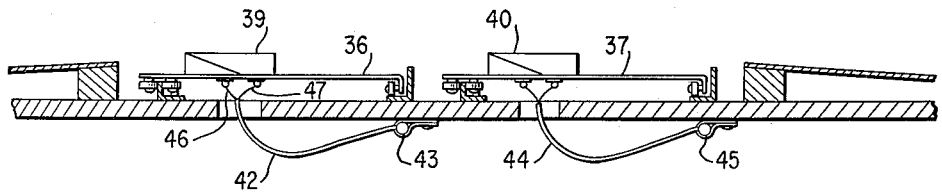
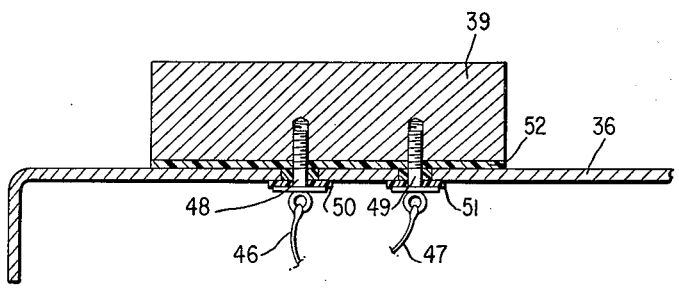
INVENTORS
SHERMAN H. FLOYD
ANDERSON J. SMITH, JR
BY *Mead, Browne, Schuyler & Beveridge*
ATTORNEYS

United States Patent Office 3,103,319
Patented Sept. 10, 1963

3,103,319
MACHINE FOR SLITTING A FABRIC INTO NARROW WIDTHS
Sherman H. Floyd and Anderson J. Smith, Jr., Greenville, S.C., assignors to J. P. Stevens & Co., Inc., New York, N.Y., a corporation of Delaware
Filed Apr. 7, 1961, Ser. No. 101,540
9 Claims. (Cl. 242—56.2)

This invention relates to improvements in machines for cutting or slitting wide width fabrics into desired narrower width fabrics. More particularly, this invention relates to an apparatus for dividing wide woven finished or coated fiber glass and related textile fabrics into narrower width fabrics.

An object of this invention is to provide an apparatus for cutting wide woven fabrics into narrow fabrics more economically.

A further object of this invention is to provide an apparatus which will take advantage of the weaving efficiency of wide woven fabrics over narrow woven fabrics.

A further object of this invention is to provide an apparatus which is effective in reducing finishing costs.

A further object of this invention is to provide an apparatus which reduces the warp and cloth handling costs.

A further object of this invention is to provide an apparatus which slits or cuts fabrics in such a manner as to produce a slit selvage which is superior to other fabrics now available on the market.

A further object of this invention is to provide an apparatus which produces fabrics with improved warping.

These and other objects will be apparent from the description which follows.

According to the present invention the foregoing objects are attained by employing a slitting apparatus or frame comprising a bracket in which is mounted a roll of finished fabric having at least two selvages previously woven into the fabric at a desired position, a cutting table or frame which supports said bracket, a free-moving slitting knife carriage mounted on a guide track on said table, and a second bracket supported by said frame in which is mounted a motor driven take-up roll which advances and also winds up the fabric as it passes from the first roll and over the slitting knife carriage and is cut into strips of the desired width. In addition more than one slitting knife carriage can be employed and the slitting knife or knives can be electrically heated.

The invention will be better understood by reference to the accompanying drawings in which:

FIG. 1 is a perspective view of a cutting machine built in accordance with the principles of our invention.

FIG. 2 is a partially exploded perspective view of the slitting knife carriage and slitting knife carriage guide track frame.

FIG. 3 is a top plan view of the slitting table with the cloth removed in part to show the slitting knife and slitting knife carriage.

FIG. 4 is a cross sectional view of FIG. 3 along line 4—4, with the removed cloth shown by a dot-dash line.

FIG. 5 is a plan view of the under side of the slitting knife carriage.

FIG. 6 is a perspective view of a modification in which a plurality of slitting knives is employed.

FIG. 7 is a sectional view along line 7—7 of FIG. 6.

FIG. 8 is a sectional view along line 8—8 of FIG. 6.

Referring to the drawings and particularly FIG. 1, a finished supply roll 18 of cloth screen C is shown positioned in the bracket 22 at the rear of the slitting table or frame 4 having supporting legs 24 and 25. The edge of the cloth or screening is held in such a manner as to guide the screening over the slitting knife 2 so that the knife is positioned directly between the two selvages, 20 and 21, at the center of the screening. The operator pulls the screening over the slitting knife until a suitable length has been hand slitted to wrap around the screening take-up roll 19 mounted on shaft 26 at the front of table 4. Drive of 26 can be accomplished in any desired manner as by chain and sprocket drive from a motor (not shown).

FIGS. 2, 3, 4, and 5 illustrate the novel manner in which the slitting knife carriage 1, having a knife 2 positioned on the center line of mounting plate 10, is mounted on the edges or rails 6 and 7 having bases 8 and 9, respectively, of the slitting knife carriage guide track 3. Due to the presence of roller bearings 11, 12, 13, 14, 15, 16 and 17 which cooperate with the rails 6 and 7 of guide track 3, carriage 1 will be capable of free movement. The degree of movement will be determined by knife 2 as it moves between selvage edges 20 and 21. More specifically the free movement manifested by carriage 1 is in a plane substantially at right angles to the cutting edge 30 of knife 2 or edge 31 of plate 10. Since carriage 1 is capable of such free movement, the knife 2 will be readily guided between selvage ends 20 and 21 so as to produce two strips of cloth, C' and C", having smooth lateral or selvage edges (FIG. 3) from the original roll of cloth C.

The effectiveness of the present apparatus in producing narrower strips of cloth having an even edge left at the slit selvage is due in part to the manner in which the selvage ends 20 and 21 have been woven into the fabric or screening. These selvage ends are woven into the fabric or screening under greater tension than the other selvages and thereby act as guide lines for the slitting knife. Specifically, a dent in the loom reed is skipped in between the outside ends of the two center selvages which forms a channel for the slitting knife. Since there is only one dent skipped between the two center selvages (approximately 3/32") there is a resultant even edge left at the slit selvage. The increased amount of tension on the outside two selvage ends located at the center of the screening also insures a desirable and even channel area. The excess tension is imparted into the outside two center selvage ends by means of special apparatus employed during weaving.

Although the size and shape of the cutting blade or knife 2 can vary somewhat, a knife 2¾ inches long and made of heat treated tool steel has been found very satisfactory. In addition the angle of the cutting blade is tapered at about 14 degrees and extending back 1⅜ inches. The tapered blade allows the split edges of the fabric to separate gradually and at the same time allows a good even build-up of the fabric on the take-up roll 19. The taper of the slitting knife in addition to it being mounted directly on the carriage eliminates any chance for the slit selvages to curl or roll. It should be mentioned that the slitting knife is so mounted on the carriage as to afford the nearest possible degree of balance, i.e. directly on the center line of the carriage itself. The carriage 1 with its attached bearings fits freely over the edges of the slitting knife carriage guide track. The roller bearings themselves act as guides for the carriage and insures that it is held properly in place at all times.

In the event more than two narrow widths are to be cut from the original broad width fabric C, two or more cutting or slitting devices can be employed on the top of the slitting table, the arrangement of which will be evident from FIGS. 6 and 7 wherein slitting table 34 has guide tracks 53 and 54 on which are mounted three carriages 36, 37 and 38, each having a slitting knife 39, 40 and 41 respectively. Moreover, the slitting knives can be electrically heated. For example, a source of current (not shown) is connected through harnesses 43 and 45 as shown in FIG. 7, to cables 42 and 44 which in turn are attached to knives 39 and 40 respectively. The detailed construction of one of the electrically heated cutting blades is shown in FIG. 8 wherein terminals 48 and 49 are connected to wires 46 and 47 of cable 42. Electrical contact between the terminals 48 and 49 and carriage 36 is prevented by the use of insulation 50 and 51 respectively. In addition a sheet 52 of insulation is provided between carriage 36 and knife 39.

The electrically heated cutting blades have been described in a general manner but it is also contemplated to use trimmer rheostats between the source of power (not shown) and the blades so as to vary the heating effect of the blades. The use of rheostats for such purpose is, of course, well known in the art. In addition the electrical heating blade or element 39 in each of the cutting blades (FIG. 8) employed can vary in power rating depending upon the material being severed. By way of example, a 25 watt heater has been found very satisfactory for most cutting or slitting operations. Although the single cutter 2 described in FIGS. 1–5 is not shown to be electrically heated, it is to be understood that cutter 2 can also be electrically heated in the manner set forth in connection with FIGS. 6, 7 and 8. In addition where multiple slitting knives are employed, as shown in FIG. 6, electrical heating means for the knives can be dispensed with, if found desirable, or one or more of the blades can be electrically heated as desired. Where more than one carriage is employed, one or two guide tracks can be used depending upon the number of carriages.

From the foregoing description, it will be evident that there has been devised a slitting apparatus admirably suited for slitting wide screening fabrics such as fiber glass and related textile fabrics into narrow width fabrics. For example, the present apparatus permits the weaving of two or more styles on the same loom simultaneously which later can be severed from each other by the novel apparatus of this invention. Not only is better warping obtained when utilizing the full width of the beam for double width weaving, for example, but the use of the present apparatus has resulted in the reduction of warping costs by about 11 percent in addition to effecting other economies in weaving and finishing costs.

While the illustrative embodiments of the invention have been described hereinbefore with particularity, it will be understood that various other modifications will be apparent to and can readily be made by those skilled in the art without departing from the scope and the spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:
1. Apparatus for slitting a web of finished fabric having adjacent selvages intermediate the lateral edges of said web comprising means for supporting a web of finished fabric to be slit, take-up means to which said web passes from said support, a slitting knife affixed to a surface of a mounting plate, said knife having a greater length than width and a forward cutting edge collectively adapted to guide the knife between said selvages, a mounting plate positioned under said web and supporting said knife and having a length and width substantially greater than the length and width of the knife whereby increased stability is imparted to said knife and its cutting edge which is opposed to the direction of movement of said web, a slitting carriage disposed between said web-supporting means and said take-up means for supporting said mounting plate, a low friction means supporting said mounting plate to permit free lateral movement with respect to said web and said carriage, and means for preventing oscillatory movement of said mounting plate with respect to the axis of movement of said web whereby said knife is maintained in alignment with the axis of movement of said web while cutting the web between said selvages.

2. The apparatus of claim 1 in which the take-up means is positively driven.

3. The apparatus of claim 1 wherein the mounting plate is rectilinear and the low friction means is a pair of laterally spaced bearings disposed adjacent that edge of said rectilinear knife-mounting plate upon which said knife is mounted.

4. The apparatus of claim 1 in which the free movement of the carriage is in a plane substantially at right angles to the selvage ends.

5. The apparatus of claim 1 in which means are provided for heating the knife.

6. The apparatus of claim 1 in which a plurality of carriages are employed.

7. The apparatus of claim 6 in which means are provided for heating at least one knife.

8. The apparatus of claim 1 in which a plurality of carriages and guide tracks are employed.

9. The apparatus of claim 8 in which means are provided for heating at least one knife.

References Cited in the file of this patent
UNITED STATES PATENTS

| | | |
|---|---|---|
| 2,328,443 | Foster | Aug. 31, 1943 |
| 2,530,134 | Taylor | Nov. 14, 1950 |
| 2,609,009 | Haefliger | Sept. 2, 1952 |
| 2,692,328 | Jaye | Oct. 19, 1954 |
| 2,910,122 | Anderson | Oct. 27, 1959 |
| 2,987,948 | Casullo | June 13, 1961 |

FOREIGN PATENTS

| | | |
|---|---|---|
| 740,926 | France | Feb. 3, 1933 |